(12) United States Patent
Rack et al.

(10) Patent No.: US 6,179,031 B1
(45) Date of Patent: Jan. 30, 2001

(54) PROCESS FOR THE ADHESION OF A FLAT PLASTIC SUBSTRATE IN THE FORM OF A CIRCULAR DISK TO A LIKE SECOND SUBSTRATE FOR A DIGITAL VIDEO DISC AND APPARATUS FOR IMPLEMENTATION OF THE PROCESS

(75) Inventors: Andreas Rack, Hanau; Peter Sauer, Schlüchtern; Stefan Szellas, Langwedel, all of (DE)

(73) Assignee: Leybold Systems GmbH, Hanau (DE)

( * ) Notice: Under 35 U.S.C. 154(b), the term of this patent shall be extended for 0 days.

(21) Appl. No.: 09/167,548

(22) Filed: Oct. 7, 1998

(30) Foreign Application Priority Data

Oct. 8, 1997 (DE) .............................. 197 44 408
Dec. 8, 1997 (DE) .............................. 197 54 390

(51) Int. Cl.[7] .............................. B32B 31/16; G11B 7/26

(52) U.S. Cl. .......................... 156/538; 118/50.1; 118/52; 156/74; 156/275.5; 156/275.7; 156/578

(58) Field of Search .................................. 156/538, 578, 156/379.8, 74, 275.5, 275.7, 295; 427/240; 118/52, 50.1

(56) References Cited

U.S. PATENT DOCUMENTS

| 4,037,830 | 7/1977 | Poluzzi et al. ............................ 269/21 |
| 4,877,475 | 10/1989 | Uchida et al. ...................... 156/273.7 |
| 5,644,564 | 7/1997 | Peters et al. . |
| 5,681,634 | 10/1997 | Miyamoto et al. .................. 428/64.6 |
| 5,744,193 | * 4/1998 | Kitano ..................................... 118/52 |
| 5,800,670 | * 9/1998 | Kitano ..................................... 156/578 |
| 5,843,257 | * 12/1998 | Inouchi ................................... 156/578 |
| 5,916,368 | * 6/1999 | Ebert ....................................... 118/52 |
| 5,993,592 | * 11/1999 | Perego ..................................... 156/578 |
| 6,042,684 | * 3/2000 | Ohman ..................................... 156/578 |

FOREIGN PATENT DOCUMENTS

| 42 02 194 C2 | 7/1993 | (DE) . |
| 9309935 | 10/1993 | (DE) . |
| 295 12 381 U1 | 11/1995 | (DE) . |
| 295 12 500 U1 | 11/1995 | (DE) . |
| 3943478C2 | 11/1995 | (DE) . |
| 195 29 945 C2 | 2/1997 | (DE) . |
| 197 29 525 A1 | 9/1998 | (DE) . |
| 59-30631 | * 2/1984 | (JP) . |
| 6-320100 | * 11/1994 | (JP) ....................................... 118/52 |
| 9-265672 | * 10/1997 | (JP) . |
| WO97/36737 | * 10/1997 | (WO) . |
| WO 97/43111 | * 11/1997 | (WO) . |

* cited by examiner

Primary Examiner—Steven D. Maki
(74) Attorney, Agent, or Firm—Smith, Gambrell & Russell, LLP

(57) ABSTRACT

Apparatus for the gluing of two substrates in six processing steps for fabrication of a digital video disc including a motor-driven plate (2) for holding the first substrate (5), a glue dispenser disposed above the plate (2), grasping and holding device for providing vertical movement of the second substrate (7). The side of the plate turned toward the first substrate (5) has a radially outer plane portion (10) in the form of a disk concentric to its axis of rotation (R) and a radially inner portion (11) adjacent to this where the face (F) of this inner portion (11) turned toward the substrate (5) is formed by the outer face of a flat, straight frustum of a cone whose peak (S) strikes the axis of rotation (R) below the plane of application (E) of the substrate (5). In the transitional area from the annular portion (10) to the conical portion (11) an annular groove (12) running coaxially to the axis of rotation is cut into the plate (2) which is connected to a pressure source via channels (13, 13', . . . ) and corresponds to teardrop or finger-like indentations or recesses (14, 14', . . . ) in the conical portion (11) extending from the annular groove (12) radially inward.

10 Claims, 2 Drawing Sheets

PROCESS FOR THE ADHESION OF A FLAT PLASTIC SUBSTRATE IN THE FORM OF A CIRCULAR DISK TO A LIKE SECOND SUBSTRATE FOR A DIGITAL VIDEO DISC AND APPARATUS FOR IMPLEMENTATION OF THE PROCESS

INTRODUCTION AND BACKGROUND

The present invention relates to a process for the adhesion of a flat plastic substrate in the form of a circular disk to a like second substrate, for example for the fabrication of a digital video disc and apparatus for implementing the process.

A holding apparatus is known for the transport and processing of a flat substrate in the form of a circular disk (DE 295 12 381), in particular of a CD or CD-ROM, consisting of a housing with a central chamber which can be connected to a pressure source. A plurality of suction cups of an elastic material are connected to the chamber via suction channels and distributed over the chamber wall turned toward the substrate. Several dosing nozzles corresponding to a distribution channel are provided in the housing, ending approximately in the plane of the suction cups, and extending parallel to the suction channels where the distribution channel is provided with an attachment for connection to a paint source.

Furthermore an apparatus is known for the lacquering of a flat substrate in the form of a circular disk (DE 295 12 500), in particular a CD, which consists of a motordriven plate rotatable about a vertical axis for holding the substrate, a lacquer dispenser disposed above the plate which has an annular collar revolving with and enclosing the plate and partially connected to it with studs, and a positionally fixed housing with an annular edge part engaging the collar from outside. The collar is formed of two portions, of which the one portion is formed as a sleeve forming a straight frustum of a cone which, enclosing the plate, extends from its radially outer edge a bit upward. The other portion of the collar is formed as a sleeve forming a straight frustum of a cone which, enclosing the plate, extends from its radially outer edge downward so that the inner wall of the upper collar plate tapering upward collects particles of paint cast off in the radial direction and upward by the plate rotating about its vertical axis and lets them run off via recesses formed by the studs in the radial outer edge area of the plate at the inner wall of the lower portion of the collar tapering downward.

A process for the partial removal of thin layers of a substrate is also known (DE 42 02 194) in which a preferably plane surface of the substrate provided with a thin layer, for example a lacquer or metal layer or the like, is set in rotation about a perpendicular axis to the surface, and a solvent or etching agent is applied to the edge area of the surface which is cast off from the substrate by centrifugal force carrying with it the dissolved or etched off layer area. The surface of the layer area to be removed is at least partially masked by means of a template which possesses an inner contour corresponding to the layer to be removed and is disposed for the formation of a capillary at a small distance from the surface, that, with feeding of solvent or etching agent, the template is set in rotation synchronously with the substrate at a definite speed of revolution. After a definite time the feeding of solvent or etching agent is stopped and the solvent or etching agent along with the dissolved or etched off layer area is cast off at an appropriately increased speed of revolution.

Moreover an apparatus for grasping and holding a flat substrate, preferably in the form of a circular disk, with a central opening, for example a compact disc, is known (DE 195 29 945). It includes several finger-like grasping elements tiltably situated in the housing wherein the grasping elements are held and guided in openings or apertures in the head portion of the housing. This permits tilting motions of the grasping elements about axes transverse to the longitudinal axis of the housing, wherein the tilting axes of all grasping elements extend in one plane and form together one polygon enclosing the longitudinal axis. Magnets are fixedly disposed at each end of the grasping elements turned away from the substrate which work together with an electromagnet provided in the housing above the magnets whose magnetic field axis coincides with the longitudinal axis of the housing and which moves the ends of the grasping elements provided with magnets back and forth between two stops according to the polarity of the electromagnet.

Finally an apparatus for the transport of digital video discs from initial stations formed as carousel transport apparatuses over several process stations to final stations has been proposed (DE 197 29 525.8) wherein the process stations cause the processing, for example, layering, checking, sorting, and gathering of the substrates and wherein grasping arms with grasping elements or suction lifters make possible the further transport of these substrates from station to station. A motor drive unit with a swivel apparatus and two lifting apparatuses are provided which can be driven separately and which work together with manipulators or grasping arms. The drive with grasping arms forming the conveyance station is disposed at the same distance from several stations, for example the preparation station, the lacquering/gluing station, the return conveyance station, and the testing station. The two lifting apparatuses of the motor drive unit simultaneously execute with their grasping arms the same and/or different lifting motions (vertical motions) and swiveling motions superimposed on these or subsequent to them.

An object of the present invention is to provide a process and an apparatus for its implementation according to which two plane substrates for a digital video disc can be adhered to one another without blisters and uniformly and in fact in such a way that the layer of adhesive hardening between the two discs is of equal density and composition throughout and for this purpose is distributed uniformly over the entire surface of the substrate before hardening.

A further object of the present invention is to specify a process and an apparatus for the transport of digital video discs.

SUMMARY OF THE INVENTION

The above and other objects of the present invention can be achieved by moving, in a first processing step, the adhesion dispenser, in the direction toward the axis of rotation of the plate holding the first substrate until the nozzle is aligned approximately to a middle zone of the substrate, and by issuing, in a second processing step, a predetermined amount of adhesive from the nozzle onto the substrate during which the plate executes a turning motion, and further by lowering, in a third processing step after the withdrawal of the adhesion dispenser from the area of the substrate, the second substrate using the grasping and holding apparatus toward the first substrate so that a predetermined narrow gap between both substrates remains and the adhesion is distributed over the upper side of the first substrate, and after a short dwelltime, by turning, in a fourth processing step again using the grasping and holding apparatus, the second substrate with respect to the first and moving it simultaneously toward the first substrate until both substrates lie firmly on one another, and then by setting, in a fifth processing step, using the grasping and holding apparatus being released from the second substrate and moved back to its starting position, both substrates adhered to one another in rapid rotation by the plate for a short time for the removal of the excess adhesion, and by feeding, in a sixth processing step, both substrates aligned to one another to a UV drying source.

For the implementation of the adhesion process, the present invention provides an apparatus for use in which the side of the plate turned toward the first substrate has a radially outer plane portion in the form of a disk concentric to its axis of rotation and a radially inner portion adjacent to this, where the face of this inner portion turned toward the substrate is formed by the outer face of a flat, straight frustum of a cone whose peak strikes the axis of rotation below the plane of application for the substrate, where in the transitional area from the annular portion to the conical portion an annular groove running coaxially to the axis of rotation is cut into the plate which on one side is connected to the pressure source via channels running in the plate and on the other side corresponds to teardrop or finger-like indentations or recesses in the conical face extending from the annular groove radially inward, where the diameter and the depth of the annular groove are approximately dimensioned so that they correspond to the annular protuberance of the substrate.

BRIEF DESCRIPTION OF DRAWINGS

The present invention will be further understood with reference to the accompanying drawings which illustrate one embodiment and wherein.

DETAILED DESCRIPTION OF INVENTION

Figure 7:
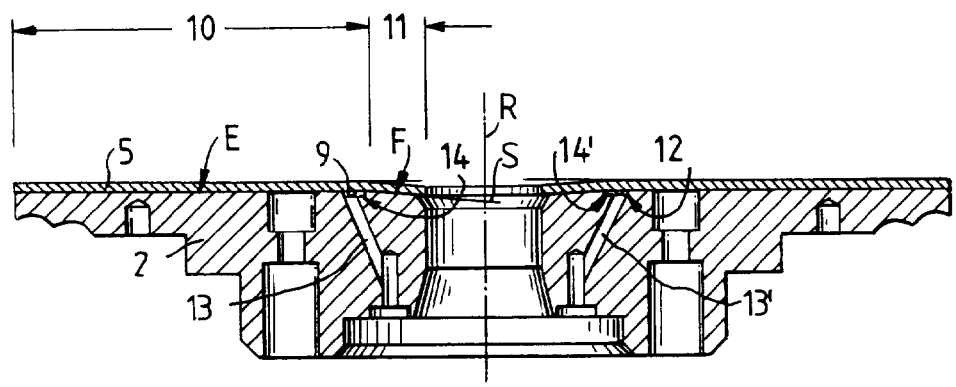
FIG. 7 is a perspective view of the transverse section through the plate in an enlarged representation.
Figure 8:
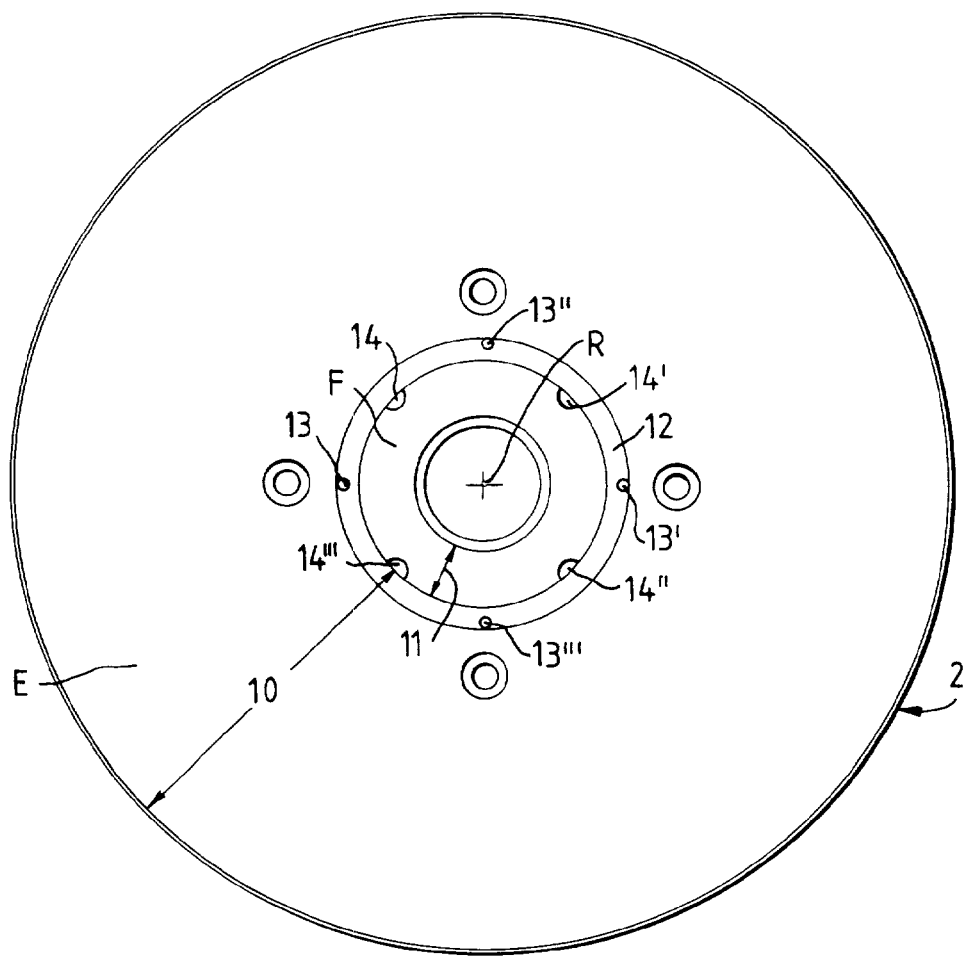
FIG. 8 is a perspective view of the plan view of the plate according to FIG. 7.

As shown in the drawings, and particularly FIGS. 7 and 8, the apparatus of the present invention features the side of the plate (2) turned toward the first substrate (5) with a radially outer plane portion (10) in the form of a disk concentric to its axis of rotation and a radial inner portion (11) adjacent to this, where the face (F) of this inner portion (11) turned toward the substrate (5) is formed by the outer face of a flat, straight frustum of a cone. The peak (S) thereof strikes the axis of rotation below the plane of application (E) of the substrate (5). In the transitional area from the annular portion (10) to the conical portion (11) an annular groove (12) running coaxially to the axis of rotation is cut into the plate (2) which on the one side is connected to the pressure source via channels (13, 13', . . . ) running in the plate and on the other side corresponds to teardrop or finger-like indentations or recesses (14, 14', . . . ) in the conical face (F) extending from the annular groove (12) radially inward. The diameter and the depth of the annular groove (12) are approximately dimensioned so that they correspond to the annular protuberance (9) of the substrate (5).

Figure 1:
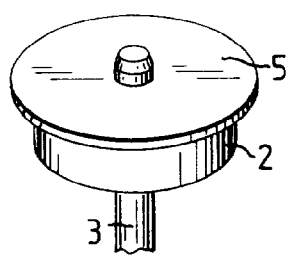
FIG. 1 is a perspective view of a plate with a substrate lying on it.
Figure 2:
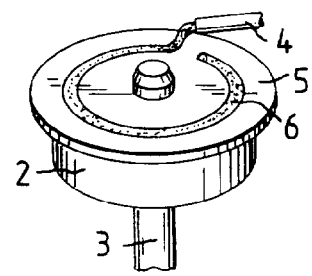
FIG. 2 is a perspective view of the plate according to FIG. 1 with a predetermined amount of adhesive applied to the substrate.
Figure 3:
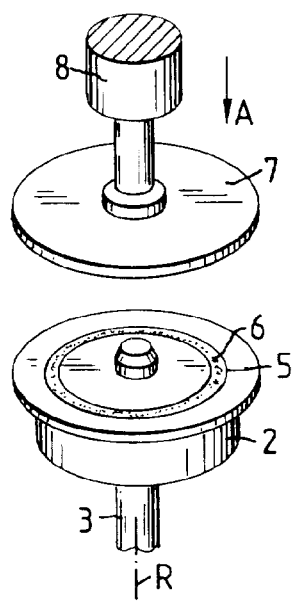
FIG. 3 is a perspective view of the plate according to FIG. 2 with the second substrate held above the first substrate.
Figure 4:
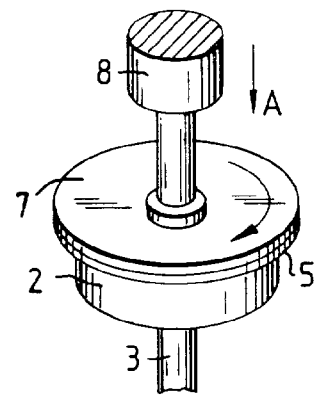
FIG. 4 is a perspective view of the slowly rotating plate with the first substrate lying on it carrying the adhesive and a second substrate lowered by the grasping and holding apparatus to the adhesive layer but held positionally fixed.
Figure 5:
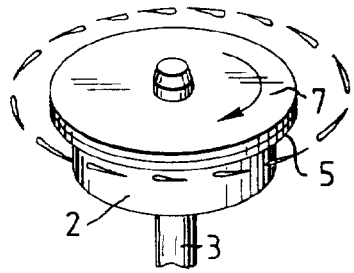
FIG. 5 is a perspective view of the two substrates disposed over one another and pressed against one another and lying on the rotating plate.
Figure 6:
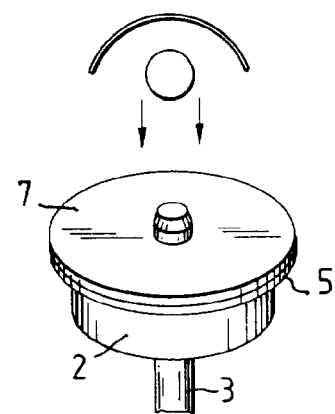
FIG. 6 is a perspective view of the plate with the two substrates lying on it and a dryer moved up to it for the acceleration of the hardening of the adhesive.

The plate 2 is coupled rotationally fixed to the shaft 3 of a motor drive unit and can be turned by it about the vertical axis of rotation R. The nozzle 4 of an apparatus for the dosed application of adhesive 6 into the area of the first substrate 5 can be moved in from the side whereby the application of adhesive is performed during a slow rotation of the plate 2. After the application of the predetermined amount of adhesive 6 in the form of an adhesive ring (FIG. 3) the second substrate 7 is moved down from above toward the first substrate 5 in the direction of the arrow A and in fact until a small distance between the two substrates 5 and 7 still remains and the adhesive is distributed in the gap remaining between both substrates 5, 7. FIG. 4 shows that the second substrate 7 is pushed to a very small degree by the grasping apparatus 8 toward the first substrate 5 whereby a small amount of excess adhesive from the gap formed by the substrates 5, 7 exits. After the release of the second substrate 7 from the grasping apparatus 8 the excess adhesive is cast off radially by a rapid turning motion.

The plate 2 has on its side turned away from the substrate 5 a plane face 10 in the form of a circular disk to which a conical indentation is adjacent radially inward, where the conical portion 11 is disposed concentrically to the axis of rotation R. The portion 11 is formed by the outer face of a very flat frustum of a cone, where the peak 5 of this frustum of a cone strikes the axis of rotation R below the plane E. The substrate 5 in the form of a circular disk has an annular protuberance 9 for which a correspondingly dimensioned annular groove 12 is cut in the plate 2, which for its part is connected via channels 13, 13', . . . to a vacuum source. On the radially inner edge of the annular groove, 12 finger-like or teardrop flattenings 14, 14', . . . are provided so that, with the substrate 5 lying on the portion 10, the radially inward lying portion 11 of the substrate 5 is drawn downward by the pressure in the gap between the underside of the substrate and the face F or the flattenings 14, 14', . . . whereby the portion 11 of the substrate 5 is conically deformed so that the adhesive 6 experiences an unhindered expansion radially inward and a sharply contoured break-away of the adhesive results.

In carrying out the process of the invention, a flat plastic substrate (5) in the form of a circular disk is adhered to a like second substrate (7) for a digital video disc with a motor-driven plate (2) rotatable about a vertical axis (R) for holding the first substrate (5), using an adhesive dispenser (4) disposed above the plate (5). Dispenser (4) is provided with a nozzle for a portioned issue of adhesive (6). An apparatus (8) is provided for grasping, holding, and providing vertical movement of the second substrate (7) from a position above the plane of the adhesive dispenser (4) to the position of the first substrate (5). A series of processing steps is carried out, where in one processing step, the glue dispenser (4) is moved in the direction toward the axis of rotation (R) of the plate (2) holding the first substrate (5) until the nozzle is aligned approximately to a middle zone of the substrate (5).

In a second processing step, a predetermined amount of adhesive (6) is issued from the nozzle onto the 20 substrate (5) during which the plate (2) executes a turning motion. In a third processing step, after the withdrawal of the adhesive dispenser (4) from the area of the substrate (5), the second substrate (7) is lowered by the grasping and holding apparatus (8) toward the first substrate (5) until a predetermined narrow gap between both substrates (5 and 7) remains and the adhesive (6) is distributed over the upper side of the first substrate (5). After a short dwelltime, in a fourth processing step, the grasping and holding apparatus (8) moves toward the first substrate (5) until both substrates (5 and 7) lie firmly on one another. Then in a fifth processing step the grasping and holding apparatus (8) is released from the second substrate (7) and moved back to its starting position and both substrates (5 and 7) adhered to one another are set in rapid rotation by the plate for a short time for the removal of the excess adhesive. Finally, in a sixth processing step, both substrates (5 and 7) aligned to one another are fed to a UV dryer (9). An conventional and suitable adhesive can be used for purposes of this invention as will be apparent to those skilled in the art.

Further various and modifications of the foregoing will be apparent to those skilled in the art and are intended to be encompassed by the claims.

German priority applications 197 44 408.8 and 197 54 390.1 are relied on and incorporated herein by reference.

What is claimed is:

1. An apparatus for holding a substrate, comprising:
    a rotatable plate member having an upper surface said upper surface including a first outer portion and a second inner portion, said inner portion and said outer portion being concentric;
    said outer portion comprising a majority of the area of said plate member and having a planar surface:
    said inner portion having the shape of an outer face of a flat, straight frustum of a cone having a peak below the plane of the outer portion;
    an annular groove being located in said outer portion next to said inner portion, said groove being connected to a pressure source for holding a substrate to said plate member,
    wherein said inner portion has indentations provided in communication with said groove so as to hold said substrate to said inner portion.

2. The apparatus according to claim 1, wherein said groove is connected to said source of pressure by way of channels extending through the plate member and being in communication with said groove.

3. The apparatus according to claim 2, wherein a diameter and depth of said annular groove correspond to an annular protrubance of said substrate.

4. The apparatus according to claim 3, wherein said plate member is connected to a drive motor through a shaft, so as to be driven thereby.

5. An apparatus for adhering two substrates to each other comprising a rotatable plate member having a side portion, a flat top portion and fitted with an axis of rotation, a side of the plate member turned toward a first of the two substrates has a radially outer plane portion in the form of a disk concentric to its axis of rotation, which defines a plane of application of the first substrate, and a radial inner portion adjacent to the outer plane portion where the face of this inner portion turned toward the substrate is formed by the outer face of a flat, straight frustum of a cone whose peak strikes the axis of rotation below the plane of application of the first substrate to thereby define a conical portion having a conical face,
    where in a transitional area from the outer plane portion to the conical portion an annular groove running coaxially to the axis of rotation is cut into the plate member which on one side of the plate member is connected to a pressure source via channels running in the plate member and on another side of the plate member, teardrop or finger shaped indentations or recesses are provided in the conical face extending from the annular groove radially inward,
    where the diameter and the depth of the annular groove are approximately dimensioned so that they correspond to an annular protuberance of the first substrate.

6. The apparatus according to claim 5, further comprising a nozzle for applying adhesive to one surface of one of said substrates.

7. The apparatus according to claim 5, further comprising:
    a shaft connected to said rotatable plate member, said shaft having an axis coinciding with said axis of rotation;
    a motor drive unit connected to said shaft for rotating said shaft and said rotatable plate member.

8. The apparatus according to claim 7, further comprising a grasping means for holding a second of said two substrates and for moving it into contact with said first substrate which can be held by said rotatable plate member.

9. The apparatus according to claim 8, wherein said grasping means moves said second substrate toward said first substrate until only a small distance remains therebetween so that adhesive can be distributed in the space between said two substrates, said grasping means then pushing the second substrate against said first substrate, causing excess adhesive to be removed.

10. The apparatus according to claim 9, wherein both substrates can be subjected to an ultraviolet dryer to cure said adhesive.

* * * * *